United States Patent [19]

Fry

[11] 4,384,312
[45] May 17, 1983

[54] LINE BREAK PROTECTION FOR MULTISPEED MOTOR

[75] Inventor: Emanuel D. Fry, Tecumseh, Mich.

[73] Assignee: Tecumseh Products Company, Tecumseh, Mich.

[21] Appl. No.: 288,108

[22] Filed: Jul. 29, 1981

[51] Int. Cl.³ .......................................... H02H 7/085
[52] U.S. Cl. ..................... 361/24; 318/782; 318/783; 318/775; 318/334; 361/27; 361/32
[58] Field of Search ................. 361/24, 26, 32, 23, 361/25, 27, 28, 29, 22, 31, 32; 318/775, 334, 782, 783, 785, 789, 790

[56] References Cited

U.S. PATENT DOCUMENTS

| | | | |
|---|---|---|---|
| 2,304,599 | 12/1942 | Rigby . | |
| 2,689,933 | 9/1954 | Veinott | 318/782 |
| 2,734,158 | 2/1956 | Seely . | |
| 2,752,548 | 6/1956 | Seely | 318/782 |
| 2,967,269 | 1/1961 | Vaughan . | |
| 2,972,708 | 2/1961 | Schaefer . | |
| 2,986,685 | 5/1961 | Epstein | 318/782 |
| 3,167,699 | 1/1965 | Renaud | 318/782 |
| 3,821,602 | 6/1974 | Linkous . | |
| 3,978,382 | 8/1976 | Pfarrer et al. | 361/22 X |
| 4,082,989 | 4/1978 | Pfarrer | 318/775 X |
| 4,263,540 | 4/1981 | Brandt et al. | 318/775 |
| 4,341,987 | 7/1982 | Fisher | 318/782 X |

Primary Examiner—Patrick R. Salce
Attorney, Agent, or Firm—Albert L. Jeffers; John F. Hoffman

[57] ABSTRACT

Overload protection for a multispeed motor is provided in the form of a plurality of line break motor protectors positioned in good heat transfer relation with the motor windings and having heating elements in circuit with the motor windings to be responsive to excessive winding current and/or excessive winding temperature to disable the windings. Certain of the line break motor protectors are operational in more than one motor speed configuration. The line break motor protectors may be of the self-resetting temperature sensing variety and circuitry is included to insure that the motor does not restart until all protectors are reset subsequent to an overload condition.

22 Claims, 1 Drawing Figure

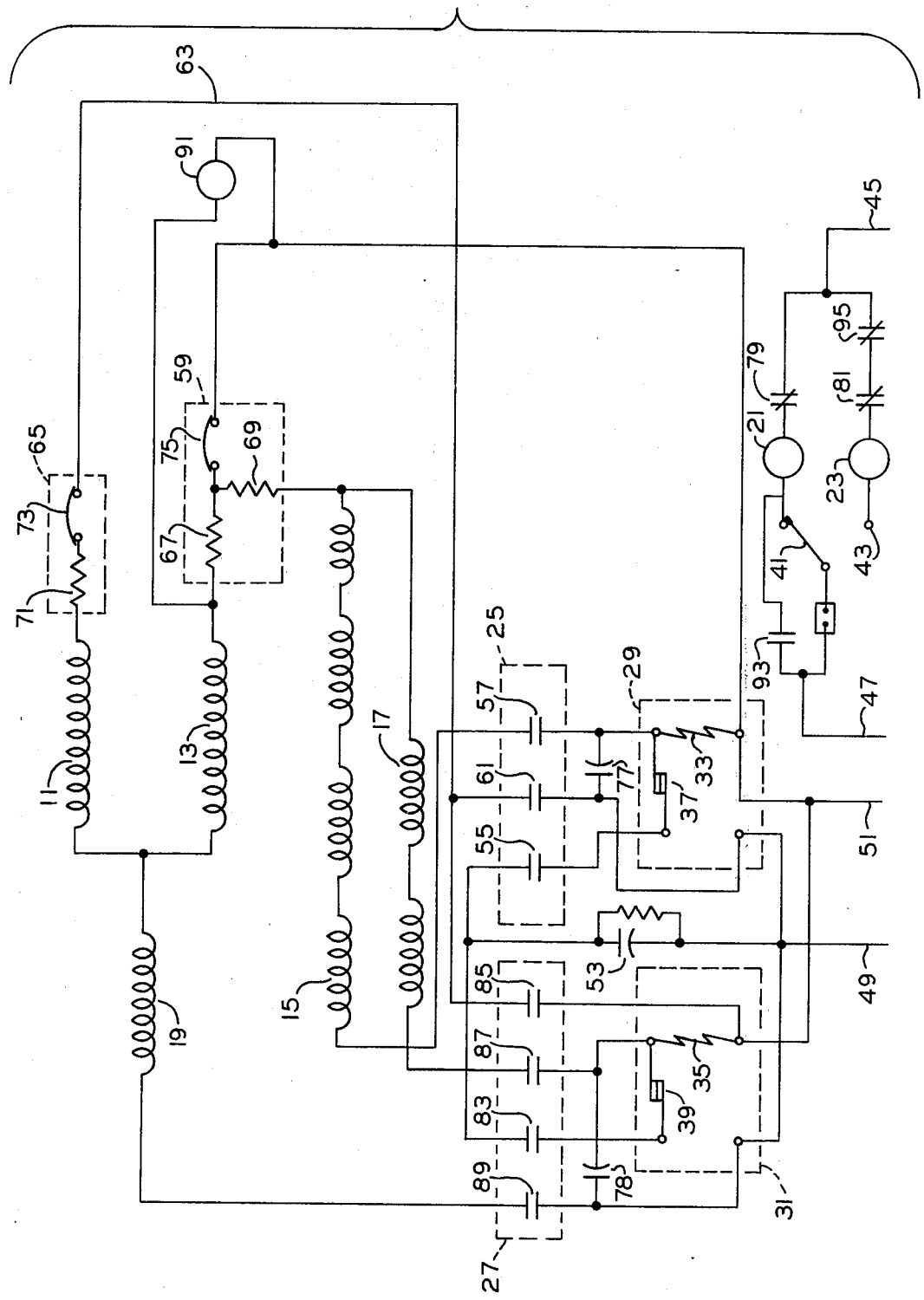

LINE BREAK PROTECTION FOR MULTISPEED MOTOR

BACKGROUND OF THE INVENTION

The present invention relates generally to overload protection arrangements for electric motors and more particularly to line break protection systems for multispeed hermetic motor arrangements.

Thermal overload protection for motors is a highly developed art with a particularly inexpensive and readily available protective device being the line break motor protector. Such devices may take the form of a bimetallic disc or other element which normally connects two terminals together but which when overheated snaps to another position opening the circuit between those terminals. This bimetallic disc or other member may be self-resetting when it cools or may require a manual reset. The thermal protector may include a heating element in series between the two terminals so that the temperature responsive bimetallic member may actuate to open the circuit between the terminals in response to excessive current flow between those terminals so that the thermal protector is responsive to excessive current, excessive temperature of its environment or some combination of the two, any of which may be indicative of an overload condition. Such thermal protectors may include additional terminals and additional heating elements for certain installations.

Another highly developed technology is that of multiple speed motors. Multiple speed single-phase alternating current operation of an electric motor is frequently achieved by operating that motor in a selected one of several possible pole number configurations. This may be achieved by providing independent windings for the several different pole configurations or by providing windings which are differently interconnected to achieve the different pole configurations, with either option being available for either the auxiliary or starting winding, or the main or running winding.

When a given motor winding is active in more than one pole configuration, overload protection has heretofore taken the form of one or more temperature sensors in thermal contact with the motor windings and connected to an external solid state logic module, as illustrated, for example, in U.S. Pat. No. 3,978,382. Such systems are subject to a number of drawbacks. The cost of the sensors and logic module is significant. Separate and essentially independent arrangements are required for detecting excessive current and detecting winding temperature increase. System complexity increases the likelihood of system malfunction. Such systems fail to effectively utilize available high production and therefore low cost parts.

SUMMARY OF THE INVENTION

Among the several objects of the present invention may be noted the provision of an economical and reliable overload protection scheme for a multispeed motor; the replacement of expensive solid state protection arrangements for multispeed motors with relatively inexpensive and readily available line break protectors; the provision of a multispeed motor employing line break motor protectors wherein certain of the protectors are operational in more than one speed determining pole configuration; and the provision of a line break motor protector arrangement wherein restart of the motor is prevented until all overload actuated protectors are reset.

These as well as other objects and advantageous features of the present invention will be in part apparent and in part pointed out hereinafter.

In general, overload protection for a pole changing motor is provided by a line break motor protector in circuit with at least one auxiliary winding and with one main winding section of the motor for interrupting current flow through the auxiliary and one main winding section in the event of an overload condition, along with a second line break motor protector in circuit with another main winding section for interrupting current flow through that other section in the event of an overload condition with both protectors being opertional in more than one pole configuration of the motor.

BRIEF DESCRIPTION OF THE DRAWING

The drawing schematically illustrates a single phase two speed pole changing motor with main windings operable in each of the two speed determining pole configurations and a pair of auxiliary windings having different pole numbers along with the overload line break motor protectors which are operational in both pole configurations.

DESCRIPTION OF THE PREFERRED EMBODIMENT

Referring now to the drawing in greater detail, a single phase two speed pole changing motor has main winding sections 11 and 13 each of which is operable in both of the speed determining pole configurations with the windings 11 and 13 connected in parallel for operation at a high speed corresponding to a two pole configuration and with windings 11 and 13 connected in series for operation at a lower speed corresponding to a four pole configuration in which two poles are consequent poles. Independent auxiliary or start windings 15 and 17, with winding 15 illustrated as a four pole start winding and winding 17 illustrated as a two pole or high speed start winding, are also located in the motor stator. An additional or extended main winding 19 may be provided and as illustrated is employed only in the two pole or higher speed motor configuration, with current flowing through that extended main winding and then branching through the two parallel paths of main winding sections 11 and 13. Pole changing motors of the variety thus far described are well known in the single phase induction motor art and are sometimes employed in hermetic environments such as, for example, for driving air conditioner compressors.

Pole configuration selection is accomplished by a pair of relays or contactors having relay actuating coils 21 and 23 and corresponding sets of contacts 25 and 27, with contact set 25 corresponding to the low speed actuating relay coil 21, while contact set 27 corresponds to the high speed relay actuating coil 23 being closed thereby.

Start up of the motor in the low speed configuration is facilitated by the potential relay 29 while start up in the high speed pole configuration is facilitated by potential relay 31. Each of these potential relays is of known design and includes a sensing coil 33 or 35 which when the voltage across the corresponding start winding becomes sufficiently high functions to open the contact set 37 or 39, disabling the corresponding start windings.

In normal operation the speed at which the motor is to operate is selected by positioning the double pole single throw switch 41 in the position illustrated for low speed operation or moving that switch so as to close on contact 43 and select high speed operation. Thus, when a pilot voltage such as might be induced by the closing of a thermostat is applied between lines 45 and 47, relay coil 21, as illustrated, will be actuated, closing each of the three contacts associated with the contact set 25. With line voltage applied to the lines 49 and 51, the start winding current may be traced beginning with line 49 passing through the start capacitor 53 by way of closed contacts 55, 37 and 57 through the four pole start winding 15, through the line break motor protector 59 to line 51. Still in the low speed or four pole configuration, the main winding current may similarly be traced beginning with line 49 through closed contacts 61 by way of line 63 and a second line break motor protector 65 through the series combination of main winding sections 11 and 13 and then through the first line break motor protector 59 to line 51.

The line break motor protectors 59 and 65 are of a known and readily commercially available design employing heating elements 67, 69 and 71 and self-resetting snap-acting bimetallic elements 73 and 75. Such temperature responsive protectors are placed in good heat transfer relation with motor windings and are available for example from Texas Instrument Company with protector 59 bearing their designation 15HM and protector 65 designated 4HM for one embodiment of the invention. A conventional run winding capacitor 77 and 78 may be provided, if desired.

In the four pole or low speed configuration, a temperature increase of the windings in the region of either of the protectors 59 and 65, or excessive main winding current so as to heat the heaters 67 or 71 may cause one of the two bimetallic strips 73 or 75 to open and the opening of either of these contacts completely disables the motor until that bimetallic element cools and closes again. Also an overload condition where excessive start winding current flows through the heater 69 may cause protector 59 to disable the system. Since the protectors 59 and 65 are in series in the low speed configuration, both must be closed or reset for motor operation, however, in the two pole configuration, some additional problems are present.

If switch 41 is moved from the position illustrated so as to close an contact 43, the high speed relay coil 23 is energized, closing the contact set 27. Note that the switch 41 functions as a mechanical lock out arrangement so that it is not possible to energize both coils 21 and 23 at the same time. Thus, in the two pole configuration, contact set 25 remains open. A further lock out arrangement is provided by having a set of normally closed contacts 79 which are opened when the relay coil 23 is energized and similarly having a set of normally closed contacts 81 which are opened when relay coil 21 is energized.

In the two pole or high speed configuration, start winding current flows by way of line 49 and the start winding capacitor 53 which is common to the two configurations by way of the closed contacts 83, 39 and 87 through the two pole start winding 17, protector heater 69 and contacts 75 to line 51. When the voltage across start winding 17 increases, indicating adequate speed, this voltage is sensed by coil 35 and contacts 39 open to disengage the start winding. The main winding current flow is from line 49, closed contacts 89 and the extended main winding section 19 whereupon the current flow branches through the two parallel connected main winding sections 11 and 13 with the current through main winding section 13 passing by way of the line break motor protector 59 to line 51 while that through main winding section 11 passes through the protector 65 and by way of line 63 and closed contacts 85 to line 51. Thus, each of the protector heaters is subjected to a different portion of the main winding current and additionally the three terminal protector 59 is responsive to the start winding current. Potential relay 31 functions as described previously to disconnect the four pole start winding when the motor reaches sufficient speed.

Suppose now that the motor is running in its four pole configuration and for some reason main winding 11 draws excessive current. This excessive current will heat the heating element 71, causing the bimetallic member 73 to open, interrupting the current flow in main winding section 11. Once protector 65 opens, the current flow in start winding section 15 increases substantially, heating element 69, and causing the bimetallic member 75 to open the second branch, thus disabling the motor.

The protectors 59 and 65 are of the self-resetting variety and in the two pole configuration the resetting of either one will reenergize the motor with only one of the two main winding sections 11 or 13 in the circuit causing repetition of the overload and cut out of the protector. Thus, when one of the protectors resets, there will be a cycling of reset, disengage, reset, etc. To avoid this cycling of the protectors, relay actuating coil 91 is connected across protector 59, specifically in parallel with the series combination of the heating element 67 and contacts 75. So long as contacts 75 remain closed, the resistance of heating element 67 is quite low and there is insufficient voltage to actuate the relay coil 91, however, when the bimetallic contact 75 opens, essentially line voltage is applied to relay coil 91, actuating that coil and closing relay contact 93 while opening the normally closed set of contacts 95, thus placing the motor in its low speed configuration where the two protectors are in series and both must reset before the motor restarts. If protector 59 resets before protector 65, the relay coil 91 will be deenergized and if switch 41 is in the high speed position, the motor is returned to its high speed pole configuration and again begins the undesirable reset cycling, however, the reset time of the protectors is a design parameter which is readily varied and by providing the protector 65 with a reset time which is less than that of protector 59, allows protector 65 to close first, thereafter protector 59 closes. The motor then starts with relay 91 being deenergized, returning the motor to whichever pole configuration has been selected by switch 41. Without relay 91 and its associated contacts, if protector 65 resets when the switch 41 was in the high speed or two pole configuration, current flow through main winding section 11 would be reestablished and protector 65 again would over heat and disconnect, again resulting in the undesirable cycling of that protector.

From the foregoing it is now apparent that a novel overload protection arrangement for a multiple speed single phase motor has been described meeting the objects and advantageous features set out hereinbefore as well as others and that modifications as to the precise configurations, shapes and details may be made by those having ordinary skill in the art without departing from the spirit of the invention or the scope thereof as set out by the claims which follow.

What is claimed is:

1. In a hermetic single phase multiple speed pole changing motor having at least two sections of main winding operable in a selected one of several speed determining pole configurations and at least one auxiliary winding for facilitating start up of the motor, internal overload protection within the hermetic environment comprising:
   a first line break motor protector in circuit with the at least one auxiliary winding and with one main winding section for interrupting current flow through the auxiliary winding and the one main winding section in the event of an overload condition; and
   a second line break motor protector in circuit with the other main winding section for interrupting current flow through said other main winding in the event of an overload condition, both said protectors being opertional in more than one pole configuration to respond to corresponding overload conditions and interrupt current flow in their respective windings.

2. The improvement of claim 1 wherein both line break motor protectors are self-resetting temperature sensing devices.

3. The improvement of claim 2 further comprising means precluding restart of the motor subsequent to an overload condition until both temperature sensing devices are reset.

4. The improvement of claim 3 wherein the means precluding comprises a lock out relay having an energizing coil connected in parallel with one of the line break motor protectors.

5. The improvement of claim 4 wherein the lock out relay includes contacts operable upon energization of the coil to interconnect the main winding sections in a slower speed pole configuration.

6. The improvement of claim 1 wherein the motor has a pair of independent auxiliary windings for start up in a selected one of two speeds.

7. The improvement of claim 6 wherein the first line break motor protector is connected in series with the selected auxiliary winding.

8. The improvement of claim 7 wherein the first line break motor protector is a three terminal device with one terminal connected to both auxiliary windings, a second terminal connected to said one main winding section and a third terminal to be connected to line voltage.

9. The improvement of claim 6 wherein the auxiliary windings are two pole and four pole windings respectively, the two main winding sections being connected in series for motor operation in one pole configuration and in parallel for motor operation in the other pole configuration.

10. The improvement of claim 9 wherein the second line break motor protector is permanently connected in series with the other main winding section regardless of the pole configuration selected.

11. The improvement of claim 10 wherein the first line break motor protector is connected in series with the selected auxiliary winding.

12. The improvement of claim 11 wherein the first line break motor protector is a three terminal device with one terminal connected to both auxiliary windings, a second terminal connected to said one main winding section and a third terminal to be connected to line voltage.

13. The improvement of claim 6 including means precluding the simultaneous energization of both auxiliary windings.

14. The improvement of claim 1 wherein each line break motor protector is of the self-resetting temperature responsive variety employing a snap acting bimetallic element responsive jointly to heat generated by current flow within the protector and to motor generated heat nearby.

15. The improvement of claim 14 wherein the first line break motor protector includes a first heating element conducting auxiliary winding current and a second heating element conducting the current flowing in the one main winding section while the second line break motor protector includes a single heating element conducting the current flowing in the other main winding section.

16. The improvement of claim 15 wherein common current flows in the second and single heating elements only in one pole configuration.

17. The improvement of claim 14 wherein the reset time of the first line break motor protector is longer than the reset time of the second line break motor protector.

18. The improvement of claim 1 including a first relay operable when energized to connect the motor windings in a first pole configuration, a second relay operable when energized to connect the motor windings in a second pole configuration and means for preventing the simultaneous energization of both relays.

19. The improvement of claim 18 wherein the means for preventing comprises a speed selecting single-pole double-throw switch for selecting one of the two relays as a candidate for energization.

20. The improvement of claim 18 wherein the means for preventing comprises a pair of normally closed contacts of the first relay in series with the second relay and a pair of normally closed contacts of the second relay in series with the first relay.

21. The improvement of claim 1 wherein the line break motor protectors are temperature responsive devices each in good heat transfer relation with motor windings and responsive to overload indicative excessive temperature thereof to interrupt winding current.

22. A single phase two speed pole changing motor having two sections of main winding operable in each of two speed determining pole configurations, a pair of auxiliary windings having different pole numbers each for facilitating start up of the motor in the corresponding selected pole configuration, a first line break motor protector operable in either pole configuration to be responsive to an overload condition to interrupt current flow through the selected auxiliary winding and through one of the main winding sections, and a second line break motor protector operable in either pole configuration to be responsive to an overload condition to interrupt current flow through the other main winding section.

* * * * *